ELECTRONIC SHUNT DETECTOR FOR A CODE COMMUNICATION SYSTEM

Filed Nov. 9, 1954

INVENTOR.
H.C.KENDALL
BY
Forest B. Hitchcock
HIS ATTORNEY

Jan. 17, 1956 H. C. KENDALL 2,731,623

ELECTRONIC SHUNT DETECTOR FOR A CODE COMMUNICATION SYSTEM

Filed Nov. 9, 1954 2 Sheets-Sheet 2

INVENTOR.
H.C. KENDALL

BY Forest B. Hitchcock

HIS ATTORNEY

United States Patent Office 2,731,623

Patented Jan. 17, 1956

2,731,623

ELECTRONIC SHUNT DETECTOR FOR A CODE COMMUNICATION SYSTEM

Hugh C. Kendall, Rochester, N. Y., assignor to General Railway Signal Company, Rochester, N. Y.

Application November 9, 1954, Serial No. 467,775

7 Claims. (Cl. 340—163)

This invention relates to code communication systems and more particularly pertains to electronic apparatus for use in detecting line shunts in a shunt type code communication system.

Various kinds of systems have been developed wherein information is transmitted by means of a code of direct-current electrical pulses carried over line wires. In many of these systems, the coded information is transmitted from each outlying field station location to a central office by selectively shunting the line wires which are normally energized at the central office. The resulting current increase in the line resulting from the shunt is readily detected at the central office by means of a series line relay which picks up each time the line is shunted and then drops away again as the shunt is removed.

It has been found desirable to provide, for use in conjunction with this kind of code communication system, a circuit organization that may be connected to the line wires and be responsive to the application of a shunt at any field station and yet require virtually no power from the line wires. Such apparatus can then be used with associated relay decoding apparatus to provide an indication repeater office, i. e. an organization where can be displayed all the indications received from the various field stations and displayed also at the central office.

It is theoretically possible to provide relay circuit means for detecting the presence of line shunts but certain difficulties arise which make the use of relay apparatus for this purpose impractical. Thus, the application of a line shunt at a field station results in zero line voltage at the shunt location, but at locations nearer the central office where the source of line energy is located the line voltage is higher. Nearer the central office there may be only a relatively small difference in line voltage between shunt and nonshunt conditions. This differential in voltage is not readily detected by a relay circuit organization but can readily be felt by an electronic system wherein the small voltage differential occurring between shunt and nonshunt line conditions can be amplified.

Although the principles of the present invention are readily applicable to a wide variety of applications as will be apparent to one skilled in the art, they are, for the purpose of disclosing one specific embodiment, shown as applied to a shunt type coded indication system.

In one such system, a central office is adapted to receive indications from each of a plurality of field stations over a single pair of line wires. In this system, stepping pulses of a particular polarity are applied to the line wires at the central office. At each field station, the stepping pulses are counted and, on the proper step as determined by the number of pulses counted, that station transmits its information to the control office by selectively shunting the line wires. One kind of indication is transmitted by shunting the line wires on the appropriate step; another kind of indication is transmitted by a failure to shunt the line wires on that step. In other words, either of two distinctive indications may be transmitted on any step.

Actually, the shunt is not applied during the stepping pulse itself as this would interfere with the reception of the stepping pulse at other field stations; instead, the central office transmits pulses of the opposite polarity between successive stepping pulses and it is on such a pulse that the field station may selectively shunt the line. These pulses of opposite polarity are, for convenience, termed indication transmission pulses.

A complete cycle of operation is initiated each time that a change occurs at any of the field stations. The stepping operation originating at the central office continues uninterruptedly to form a complete cycle of operation as determined by a counter at the central office similar to the one provided at each field station. When the proper number of stepping pulses to form a complete cycle have been transmitted as determined by this counter, the cycle is terminated. A system of this kind has been disclosed in the prior application of N. B. Coley et al., Ser. No. 397,650, filed December 11, 1953.

Described briefly, the present invention comprises two electron tubes. Each tube has its control grid connected through a resistor to a respective one of the line wires. The cathodes of both tubes are connected in parallel through a biasing network to the junction of two equal-value resistors connected across the line wires. In this way, one of the tubes becomes conductive when one polarity of voltage is present on the line wires because its normal cutoff bias is overcome by the applied line voltage, and the other tube becomes conductive when the opposite polarity of voltage appears on the line wires so as to overcome its bias voltage. When the line wires are shunted, the line voltage decreases so that neither tube can be conductive.

The plate current of each tube controls the energization of a corresponding winding of a relay with one winding of the relay being connected to the corresponding plate of the tube through a front contact of the relay. The resulting circuit organization operates in such a manner that the relay is normally picked up but is dropped away when a shunt is applied to the line wires at any field station on the respective indication transmission pulse. The relay then remains dropped away on the following stepping pulse, even though the line wires are then energized to the normal voltage level because its front contact is open and the corresponding winding cannot be energized. The relay can then pick up again only on the next indication transmission pulse provided that the line wires are then not shunted.

The electronic power supply provided in this organization for the control of the two relay controlling tubes is so organized that a momentarily high voltage surge is available when the relay is first energized, and this momentarily higher voltage facilitates the quick picking up of the relay.

Accordingly, one object of the present invention is to provide electronic apparatus that may be connected to the line wires of a shunt type, direct-current code communication system to detect the presence of line shunts produced at the various field stations.

Another object of this invention is to provide a shunt detecting system of the kind described having a cooperating power supply means effective to produce an initial voltage surge to aid in the quick picking up of an electromagnetic relay.

An additional object of this invention is to provide an electronic shunt detecting system wherein a relay is actuated in response to the shunting of the line wires and remains in such actuated position for the following stepping pulse even though the line wires are then no longer shunted.

Other objects, purposes, and characteristic features of this invention are in part obvious from the accompanying drawings and in part pointed out as the description of the invention progresses.

In describing this invention in detail, reference is made to the accompanying drawings in which like reference characters designate corresponding parts throughout the several views and in which.

To simplify the illustrations and facilitate in the explanation of this invention, the various parts and circuits are shown diagrammatically and certain conventional illustrations are used. The various relays and contacts are illustrated in a conventional manner and the symbols (+) and (−) are used to indicate connections to the opposite terminals of a battery or other source of direct current instead of showing all of the connections to these terminals.

Figure 1:
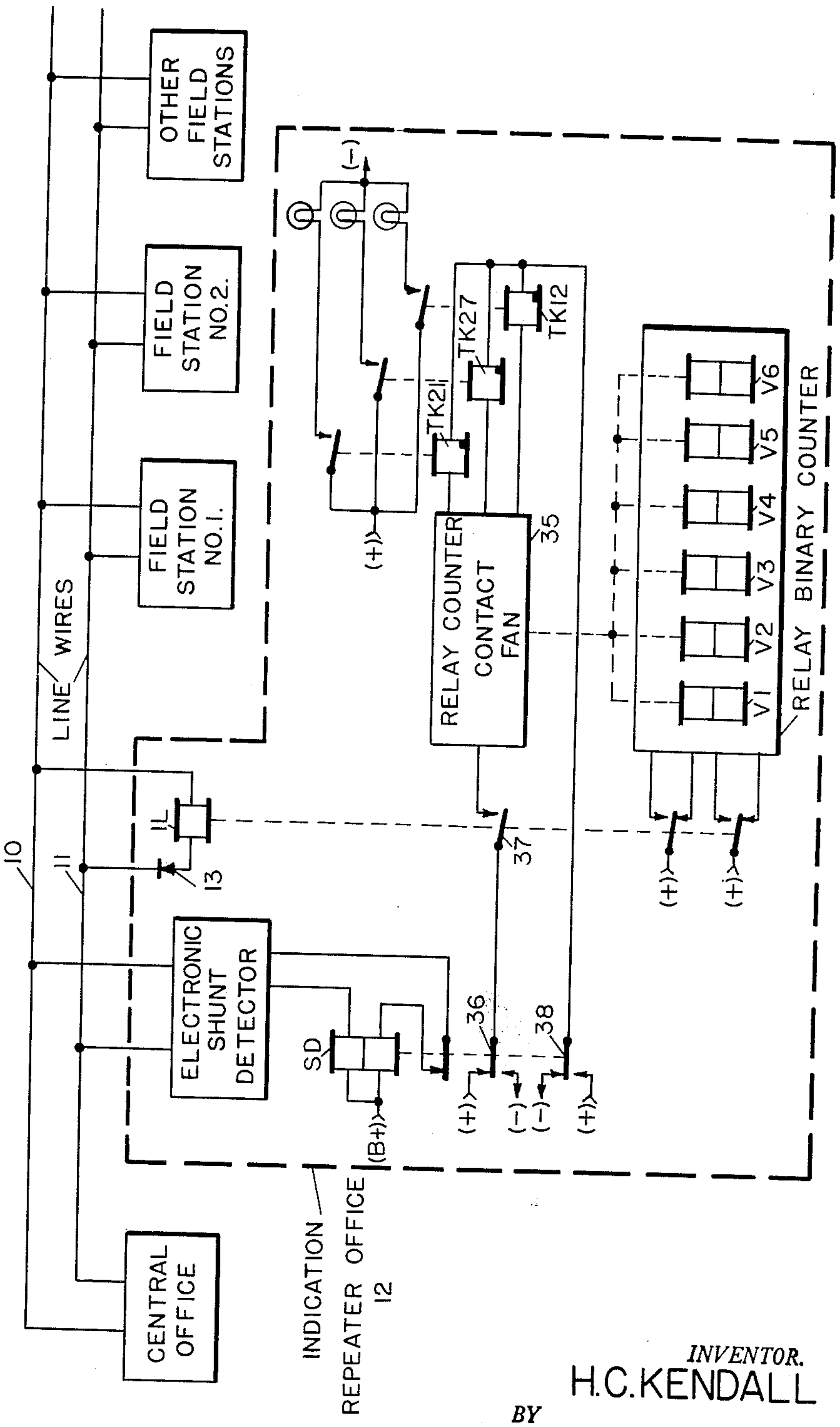
Fig. 1 is a partially diagrammatic view showing the organization of the indication system as a whole and also a more detailed circuit drawing of a typical indication repeater station.
Figure 2:
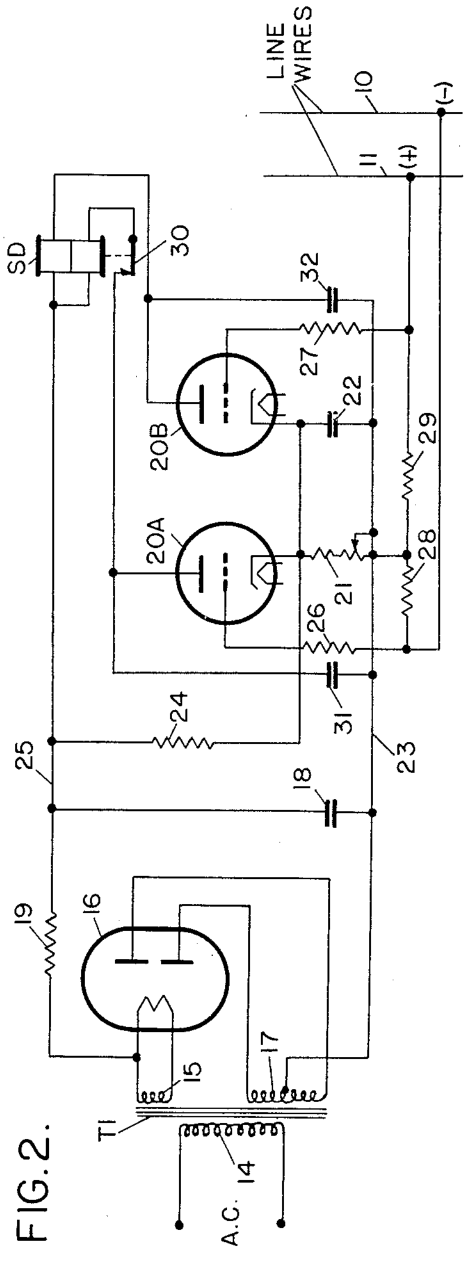
Fig. 2 is a circuit diagram of the electronic shunt detection system of the present invention.

Fig. 1 illustrates a pair of line wires 10 and 11 to which is connected each of a number of field stations and also a central office. The central office includes means for applying the stepping pulses and the indication transmitting pulses to the line wires along with counting means and means to decode and display the received indications. The indication repeater office 12 includes the electronic shunt detector shown in detail in Fig. 2 which has its input terminals connected directly to the line wires 10 and 11. This shunt detector controls the operation of a two winding neutral type relay SD. This relay is normally energized and becomes dropped away only upon the occurrence of a line shunt as will be explained in detail.

A relay 1L is also connected to the line wires through a rectifier 13. Normally, line wire 10 is at a negative polarity with respect to line wire 11 with the result that direct current cannot pass through rectifier 13. Relay 1L is, therefore, normally in a dropped-away condition. Each stepping pulse supplied to the line wires at the central office results in a reversal of polarity on the line wires, and this causes current to pass through the winding of relay 1L and pick this relay up. As will subsequently be described, the intermittent operation of the relay 1L in response to the stepping pulses applied to the line wires during a cycle of operation causes the stepping relays V1 to V6 to operate through all their various permutations of conditions. On each succeeding step a different one of the indication relays such as the respective relays TK21, TK27, and TK12 is energized, and the polarity of its energization is dependent upon the condition of relay SD at that particular instant. In this way, each indication relay is actuated on each cycle in accordance with whether the line wires were shunted at the respective station during that cycle. The actuated condition of each relay then determines whether the associated indication lamp shall be dark or illuminated.

The power supply (see Fig. 2) for the electronic shunt detector includes a transformer T1 having its primary winding connected to a commercial power source. The secondary winding 15 provides heating power for the cathode of the full-wave rectifier tube 16. The other secondary winding 17 has its opposite terminals connected to the respective plates of the tube 16. The center tap of this secondary winding 17 is connected through filter capacitor 18 and resistor 19 to the cathode of tube 16.

Tubes 20A and 20B are grid controlled tubes and may be triodes. The cathodes of these tubes are connected in parallel through a potentiometer 21 and parallel capacitor 22 to the negative output wire 23 of the power supply. These cathodes are also connected through a resistor 24 to the positive output wire 25 of the power supply. A voltage divider is thus formed that causes a positive voltage to appear on the cathodes of tubes 20A and 20B of sufficient magnitude to cause these tubes to both be cut off in the absence of any signal appearing on line wires 10 and 11. The control grid of tube 20A is connected through resistor 26 to the normally negative line wire 10. The control grid of tube 20B is connected through resistor 27 to the normally positive line wire 11. Resistors 28 and 29 are connected in series across line wires 10 and 11, and these resistors are of an equal value of resistance. The junction of these resistors 28 and 29 is connected directly to the negative power supply wire 23.

As explained, the bias voltage provided at the cathodes of tubes 20A and 20B causes them to both be nonconductive when no voltage appears on the line wires 10 and 11. Under the normal conditions, however, such as occur when the system is in a state of rest, and also during each indication transmission pulse when the line wires are not shunted, the line wire 11 is at a positive polarity with respect to line wire 10. As a result, the control grid of tube 20B is driven sufficiently positive with respect to its cathode to cause it to become conductive. The passage of plate current of this tube through the upper winding of relay SD then causes this relay to pick up. As the same time, the control grid of tube 20A is made more negative with respect to its cathode so that this tube can only remain nonconductive. When the polarity of energization applied to line wires 10 and 11 is reversed so that line wire 10 becomes positive with respect to line wire 11, as occurs on each stepping pulse, the control grid voltage of tube 20A is raised with respect to that of its cathode so that it can become conductive. At the same time, the grid of tube 20B is driven negatively with respect to its cathode so that the associated plate no longer conducts current through the upper, pick-up winding of relay SD.

If relay SD is picked up on an unshunted indication transmission pulse when line wire 11 is positive with respect to line wire 10, a sudden reversal of polarity of the energy applied to the line wires occurring at the beginning of a stepping pulse causes tube 20A to become conductive and tube 20B nonconductive. This reversal of conductive conditions of tubes 20A and 20B as the line polarity is reversed takes place rapidly. There is, consequently, no sufficient time following the deenergization of the upper winding for the relay to drop away before the lower winding is energized through front contact 30 of the relay. Similarly, a subsequent reversal of line polarity restoring tube 20B to a conductive condition and tube 20A to a nonconductive condition occurs so rapidly that relay SD cannot drop away. As additional safeguards, the capacitors 31 and 32 are provided to shunt the plate-cathode circuits of tubes 20A and 20B respectively. These capacitors tend to maintain the associated relay winding energized during the short switching intervals.

If the line wires 10 and 11 are shunted on any indication transmission pulse so that line wire 10 is not sufficiently positive with respect to line wire 11 to overcome the normal cutoff bias of tube 20B, relay SD will not pick up. Under these circumstances, the increase of grid voltage of tube 20A at the beginning of the next stepping pulse cannot cause this tube to conduct because of the open front contact 30 of relay SD. Relay SD, consequently, remains dropped away on this stepping pulse immediately following the shunted indication transmission pulse.

Figure 3:
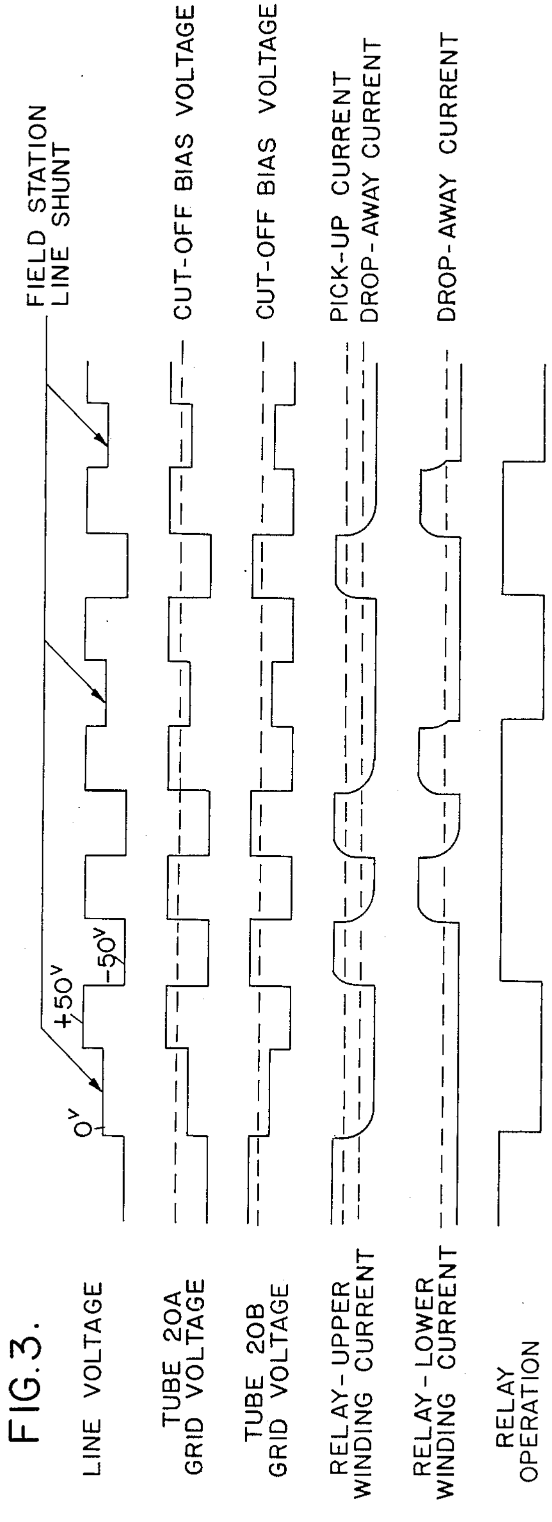
Fig. 3 is a waveform diagram illustrating the manner in which various voltages vary with time in the operation of the system.

As shown in Fig. 3, the line polarity is normally such that line wire 10 is of negative polarity with respect to line wire 11. Under these conditions, tube 20B is conductive so that the upper winding of relay SD is energized and the relay is picked up as is shown in Fig. 3.

At the beginning of each cycle of operation, a shunt is placed on the line wires at one of the field stations to initiate the cycle. As shown in Fig. 3, the line voltage is then reduced to a low value, although as previously mentioned, the voltage may not actually be reduced to zero. The line voltage is, however, sufficiently reduced so that tube 20B can no longer conduct enough current to maintain relay SD picked up. The relay then drops away as is graphically illustrated. Following this shunt period, the central office causes a stepping pulse to be applied to the line wires, and this pulse causes wire 10 to become positive with respect to wire 11. This condition raises the grid-cathode voltage of tube 20A, but cannot result in actuation of relay SD because of the open front contact 30 of this relay.

On the following indication transmission pulse when line wire 10 again becomes negative with respect to wire 11, tube 20B becomes conductive so that the upper winding of relay SD is energized and this relay then picks up. On the next stepping pulse applied to the line wires, tube 20A becomes conductive so that relay SD is maintained energized through its own front contact 30. The same condition results on the next indication transmission pulse and following stepping pulse shown in Fig. 3.

On the next-occurring indication transmission pulse, however, a shunt is shown as being applied to the line wires, and this reduces the line voltage sufficiently so that tube 20B cannot conduct enough plate current through the upper winding of relay SD to maintain this relay picked up. Relay SD then drops away and opens its front contact 30. On the next stepping pulse, the control grid of tube 20A is driven positive with respect to its cathode but relay SD must remain dropped away because of its open front contact 30. It can thus be seen that each shunt applied to the line wires causes the shunt detecting relay SD to drop out, and this relay then remains in this condition for the following stepping pulse even though there is then sufficient voltage appearing across the line wires to overcome the cutoff bias on the grid of tube 20A.

The positive bias voltage available at the cathodes of tubes 20A and 20B can be varied by moving the sliding tap of potentiometer 21 so as to include more or less resistance in the cathode circuit. In this way, the sensitivity of tubes 20A and 20B can be varied to suit existing conditions.

When the line wires are shunted on an indication transmission pulse, tube 20B becomes nonconductive and tube 20A remains nonconductive on the following stepping pulse as already explained. At such times, there is no flow of plate current through potentiometer 21 so that the cathode bias voltage of tubes 20A and 20B is a minimum, thereby increasing the sensitivity of these tubes. If it were not for capacitor 22, this sensitivity would be immediately lowered by the increased cathode voltage resulting from an attempt to pick up relay SD by the plate current of tube 20B. However, capacitor 22 maintains the cathode voltage at its minimum value for a limited time so that the high sensitivity is maintained until relay SD is picked up.

When there is zero or substantially zero line voltage present as occurs during a shunted indication transmission pulse, neither tube 20A nor tube 20B is conductive. Under these conditions, there is no flow of current through the resistor 19 as a result of tube conduction so that the voltage appearing between wires 23 and 25 is of a considerably higher value than normally appears when either of the tubes is conducting and causing increased current to flow through resistor 19. The capacitor 18 is charged to this high value of voltage so that this higher voltage value is effective for a limited time to aid in the quick picking up of relay SD when line wire 11 next becomes negative with respect to line wire 10. After a brief interval, as determined by the time constant in the discharge circuit for capacitor 18, the voltage available between wires 23 and 25 is reduced to its normal lower value. It has been found in practice that the voltage thus temporarily provided may be as much as twice the normal voltage available, and this provides for a quick picking up of relay SD and minimizes any tendency of the contacts of this relay to close only momentarily following relay energization.

Relay 1L shown in Fig. 1 controls the operation of a counting device. This counting device may be of the kind shown in Fig. 2A of the N. B. Coley et al. patent application, Ser. No. 397,650, dated December 11, 1953. This is a binary type of relay counting organization which responds to each picking up and dropping away of relay 1L by actuating one of the counting relays employed (corresponding to relays V1 to V6 in Fig. 2A of the above mentioned application of Coley et al.). This counter has been shown only diagrammatically in Fig. 1 of the present invention since its detailed circuit organization and manner of operation may be readily determined by referring to the cited application. Upon each operation of the relay 1L, the various counting relays each assume a different permutation of their respective conditions so that the relay counter contact fan 35 can close a different circuit for each such operation and thus selectively energize a different one of the indication relays of which only a representative three are shown in Fig. 1.

As already described, each field station can selectively shunt the line wires to transmit one of the two possible indications only on the indication transmission pulse immediately following the stepping pulse related to that station. Upon the occurrence of such a shunt to the line wires, the relay SD is dropped away by the electronic shunt detector in a manner already described. Upon the following stepping pulse, the relay SD remains dropped away through deenergization of its lower stick winding. At this time also, the relay 1L is picked up because the stepping pulse causes line wire 10 to be positive at such time. Therefore, current can readily pass through the winding of relay 1L and through rectifier 13. With relay 1L picked up, a circuit is completed through back contacts 38 of relay SD, through a selected one of the indication relays as selected by the fan 35, front contact 37 of relay 1L, and back contact 36 of relay SD.

If the line wires are not shunted by the field station on its particular indication transmission pulse in the cycle, relay SD remains picked up and is maintained in that condition on the following stepping pulse when relay 1L is picked up. Under these circumstances, a circuit is completed from (+), through front contact 36 of relay SD, front contact 37 of relay 1L, through contacts of the counting relays included in the relay counter contact fan 35, through one of the indication relays as selected by the fan 35, and through front contact 38 of relay SD, to the terminal (−). It can thus be seen that each indication relay is energized with a polarity of current that is dependent directly upon whether a shunt appeared on the line wires on the corresponding indication transmission pulse. In this way, the various indication relays are selectively actuated in accordance with the indications transmitted so that corresponding visual indications may be provided at this indication repeater office which will correspond with those appearing at the central office.

Having described an electronic shunt detector for a code communication system as one specific embodiment of this invention, I desire it to be understood that this form is selected to facilitate the disclosure of the invention rather than to limit the number of forms it may assume; also, various modifications, adaptations, and alterations may be applied to the specific form shown to meet the requirements of practice without in any manner departing from the spirit and scope of the invention.

What I claim is:

1. A shunt detector for a direct-current code communication system of the kind wherein a pair of normally energized line wires connecting the central office to a remote field station location is selectively shunted in a distinctive code pattern comprising electron tube circuit means being controlled to a conductive condition by the voltage appearing on said line wires but becoming nonconductive when the voltage on said line wires is reduced by a shunt application, a nonregulated power supply means for energizing said electron tube circuit means and being effective to provide a substantially higher voltage to said electron tube circuit means when nonconductive than when conductive, reactive circuit means associated with said power supply circuit means and being effective to cause said higher voltage to persist momentarily when said electron tube circuit means first becomes conductive, whereby the sensitivity of said electron tube circuit means to the voltage on said line wires is momentarily increased.

2. An electronic shunt detector for a direct-current code communication system of the kind in which a pair of normally energized line wires is selectively shunted at remote field station locations comprising electron tube circuit means connected to said line wires, an electron tube rectifier for providing a direct-current output voltage for the operation of said electron tube circuit means, said rectifier being provided with an output filter for smoothing the rectified output of said rectifier comprising a series resistor and capacitor, said electron tube circuit means being energized by the voltage appearing across said capacitor, a relay being energized by the plate current provided by said electron tube circuit means, the voltage appearing across said capacitor being a maximum when said electron tube circuit means is nonconductive and said relay is dropped away, said maximum voltage persisting for a limited time as determined by the time constant for the discharging of said capacitor when said electron tube circuit means first becomes conductive in response to the voltage appearing across said line wires to thereby provide a momentarily high voltage as an aid in the picking up of said relay.

3. In a direct-current code communication system, a pair of line wires connecting each of a plurality of field stations with a central office, said central office causing direct-current stepping pulses of one polarity and alternately indication transmission pulses of the opposite polarity to be successively applied to said line wires, and indication repeater station including shunt detection apparatus having two electron tubes, said tubes being both normally biased to a nonconductive condition, circuit means for causing one of said tubes to become conductive in response to each stepping pulse applied to said line wires and for causing the other of said tubes to become conductive in response to each indication transmission pulse applied to said line wires, said tubes both becoming substantially nonconductive when said line voltage is reduced on an indication transmission pulse by the application of a line shunt at any of said field stations, a relay having two windings, circuit means for causing one winding of said relay to be energized by the plate current of said one tube through a front contact of said relay and for causing the other of said windings to be energized directly by the plate current of the other of said tubes, whereby said relay is normally in a picked-up condition as said stepping and indication transmission pulses are successively applied to said line wires but is dropped away on an indication transmission pulse when said line wires are shunted on such pulse at any field station and remains in said dropped-away condition throughout the following stepping pulse, and circuit means associated with said relay to decode the selective shunting and nonshunting of the line wires on the successive indication transmission pulses for providing visual indications of the indication transmitted by said field stations.

4. An electronic shunt detector for a direct-current code communication system of the kind in which a pair of normally energized line wires is selectively shunted at remote field station locations comprising electron tube circuit means connected to said line wires, a source of direct-current voltage for operating said electron tube circuit means, a voltage dividing network associated with said source of voltage to provide a normal cutoff bias for said electron tube circuit means and including the cathode resistor for said electron tube circuit means, a capacitor shunting said cathode resistor and tending to prevent an immediate increase in biasing voltage each time said electron tube circuit means becomes conductive, a relay controlled to be picked up by the plate current of said electron tube circuit means, whereby said tube initially conducts a large plate current to cause said relay to pick up quickly and said bias voltage provided by said voltage divider is prevented by said capacitor from immediately rising to limit the current to said relay.

5. A shunt detector for a direct-current code communication system of the kind wherein a pair of normally energized line wires connecting a central office to a remote field station location is selectively shunted in a distinctive code pattern comprising electron tube circuit means being controlled to a conductive condition by the voltage appearing on said line wires but becoming nonconductive when the voltage on said line wires is reduced by the application of a shunt, a nonregulated power supply means for energizing said electron tube circuit means and being effective to provide a substantially higher voltage to said electron tube circuit means when nonconductive than when conductive, reactive circuit means associated with said power supply circuit means and being effective to cause said higher voltage to persist momentarily when said electron tube circuit means first becomes conductive, a cathode resistor for said electron tube circuit means to provide a bias voltage, a capacitor in parallel with said cathode resistor and effective to prevent an immediate increase in bias voltage as said electron tube circuit means first becomes conductive to thereby prevent a decrease in sensitivity resulting from an increase in bias voltage.

6. An electronic shunt detector for a code communication system of the kind having a pair of normally energized line wires connecting a central office to each of a plurality of field stations with said line wires having stepping and indication transmission pulses of opposite polarity applied thereto successively and being selectively shunted by each of said field stations in turn, said shunt detector comprising two electron discharge tubes each biased to a normal nonconductive condition, said cathodes of said tubes being both connected to a mid voltage point with respect to the voltage appearing on said line wires, circuit means for connecting the control grid of each of said tubes to a respective one of said line wires, said tubes becoming alternately conductive as said stepping and indication transmission pulses are alternately applied to said line wires, said tubes remaining in their normal nonconductive condition when said line wires are shunted at a field station so as to result in a lower line voltage, circuit means including a relay being controlled by the plate currents of said tubes, whereby said relay is steadily picked up as said stepping and indication pulses are continuously applied to said line wires but is dropped away in response to the shunting of said line wires.

7. In a code communication system, a pair of line wires connecting a central office with each of a plurality of field stations, said line wires having direct-current stepping pulses of one polarity and alternate indication transmission pulses of the opposite polarity applied thereto successively during a cycle of operation, said line wires being selectively shunted on each indication transmission pulse by a respective one of said field stations, shunt detecting means at an indication repeater station having a first and a second electron discharge tube each biased to be normally nonconductive, two resistors of equal value connected in series across said line wires, each of said tubes having its cathode connected through a biasing network to the junction of said resistors, each of said tubes having its control grid connected through a grid leak resistor to a respective one of said line wires, said first tube becoming conductive on each stepping pulse and said second tube becoming conductive on each indication transmission pulse provided said line wires are not shunted, a relay having two windings, one winding of said relay being energized by the plate current of said first tube through a front contact of said relay and the other winding of said relay being energized directly by the plate current of said second tube, whereby said relay is continually in a picked-up condition as said stepping and indication transmission pulses are successively applied to said line wires but is dropped away when said line wires are shunted on any indication transmission pulse and remains dropped away for the next following stepping pulse.

References Cited in the file of this patent

UNITED STATES PATENTS

| | | |
|---|---|---|
| 2,350,668 | Baughman | June 6, 1944 |
| 2,532,870 | Voltz | Dec. 5, 1950 |
| 2,552,013 | Orpin | May 8, 1951 |